United States Patent
Sha et al.

(10) Patent No.: US 8,498,342 B1
(45) Date of Patent: Jul. 30, 2013

(54) DEBLOCKING FILTERING

(75) Inventors: Li Sha, San Jose, CA (US); Ching-Han Tsai, San Jose, CA (US); Chi-Kuang Chen, Santa Clara, CA (US); Yaojun Luo, Pleasanton, CA (US); Guan-Ming Su, Fremont, CA (US); Ye Zhou, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 805 days.

(21) Appl. No.: 12/511,629

(22) Filed: Jul. 29, 2009

Related U.S. Application Data

(60) Provisional application No. 61/085,995, filed on Aug. 4, 2008, provisional application No. 61/084,340, filed on Jul. 29, 2008, provisional application No. 61/084,422, filed on Jul. 29, 2008, provisional application No. 61/084,342, filed on Jul. 29, 2008.

(51) Int. Cl.
*H04N 11/02* (2006.01)

(52) U.S. Cl.
USPC ........... 375/240.26; 375/240.27; 375/240.29; 348/241; 382/268; 382/275

(58) Field of Classification Search
None
See application file for complete search history.

(56) References Cited

U.S. PATENT DOCUMENTS

| | | |
|---|---|---|
| 4,449,190 A | 5/1984 | Flanagan et al. |
| 5,245,704 A * | 9/1993 | Weber et al. .................. 709/215 |
| 5,623,474 A | 4/1997 | Oshio et al. |
| 5,778,029 A | 7/1998 | Kaufman |
| 6,031,628 A | 2/2000 | Jacob et al. |
| 6,255,906 B1 | 7/2001 | Eidson et al. |
| 6,266,517 B1 | 7/2001 | Fitzpatrick et al. |
| 6,275,685 B1 | 8/2001 | Wessel et al. |
| 6,639,944 B1 | 10/2003 | De Haan et al. |
| 6,667,659 B2 | 12/2003 | Stengel et al. |
| 6,731,406 B1 | 5/2004 | Ganapathy et al. |
| 6,912,249 B2 | 6/2005 | Haartsen |
| 6,950,469 B2 | 9/2005 | Karczewicz et al. |
| 6,983,026 B2 | 1/2006 | Pinckley et al. |
| 7,023,941 B1 | 4/2006 | Rey et al. |
| 7,262,722 B1 | 8/2007 | Jahanghir et al. |
| 7,362,818 B1 | 4/2008 | Smith et al. |
| 7,418,057 B2 | 8/2008 | Shako et al. |
| 7,447,274 B2 | 11/2008 | Shako et al. |
| 7,450,641 B2 * | 11/2008 | Sun et al. .................. 375/240.16 |
| 7,466,762 B2 | 12/2008 | Shako et al. |
| 7,599,431 B1 | 10/2009 | Anderson et al. |
| 7,675,886 B2 | 3/2010 | Agrawal et al. |
| 7,702,020 B2 | 4/2010 | Gallant et al. |
| 7,706,475 B1 | 4/2010 | Kopikare et al. |
| 7,782,973 B2 | 8/2010 | Kim et al. |
| 7,822,147 B2 | 10/2010 | Huang et al. |
| 8,014,737 B2 | 9/2011 | Pratt et al. |
| 8,160,150 B2 | 4/2012 | Moore |

(Continued)

OTHER PUBLICATIONS

Non-Final Office Action, U.S. Appl. No. 12/269,744, (Aug. 18, 2011), 10 pages.

(Continued)

*Primary Examiner* — Christopher S Kelley
*Assistant Examiner* — Christopher Findley

(57) ABSTRACT

This disclosure describes tools capable of generating messages for use in deblocking filtering a video stream, the messages based on prediction parameters extracted from the video stream.

20 Claims, 12 Drawing Sheets

U.S. PATENT DOCUMENTS

| | | | |
|---|---|---|---|
| 2002/0067773 | A1 | 6/2002 | Jackson et al. |
| 2002/0072346 | A1 | 6/2002 | Kato et al. |
| 2003/0164736 | A1 | 9/2003 | Stengel et al. |
| 2003/0179831 | A1 | 9/2003 | Gupta et al. |
| 2004/0090909 | A1 | 5/2004 | Khlat |
| 2004/0232984 | A1 | 11/2004 | Meade et al. |
| 2005/0018519 | A1 | 1/2005 | Nii |
| 2005/0213661 | A1 | 9/2005 | Xiang et al. |
| 2005/0231292 | A1 | 10/2005 | Akahori et al. |
| 2005/0243946 | A1 | 11/2005 | Chung et al. |
| 2006/0126962 | A1* | 6/2006 | Sun ............................... 382/268 |
| 2006/0174236 | A1* | 8/2006 | Stein et al. .................... 717/151 |
| 2006/0227895 | A1 | 10/2006 | Booth et al. |
| 2007/0025448 | A1* | 2/2007 | Cha et al. ................. 375/240.24 |
| 2007/0086528 | A1* | 4/2007 | Mauchly et al. ......... 375/240.24 |
| 2007/0118791 | A1 | 5/2007 | Hepler et al. |
| 2007/0135065 | A1 | 6/2007 | Leffel et al. |
| 2007/0241812 | A1 | 10/2007 | Yang et al. |
| 2008/0031376 | A1 | 2/2008 | Ban |
| 2008/0049709 | A1 | 2/2008 | Pan et al. |
| 2008/0074289 | A1 | 3/2008 | Sauder et al. |
| 2008/0094280 | A1 | 4/2008 | Fenton |
| 2008/0219373 | A1 | 9/2008 | Zhang et al. |
| 2008/0270344 | A1 | 10/2008 | Yurick et al. |
| 2009/0097533 | A1 | 4/2009 | Lakkis |
| 2009/0103622 | A1 | 4/2009 | Tripathi et al. |
| 2009/0181622 | A1 | 7/2009 | Hardacker |
| 2009/0257526 | A1 | 10/2009 | Wang et al. |
| 2009/0310704 | A1 | 12/2009 | Jethanandani et al. |
| 2010/0035554 | A1 | 2/2010 | Ba et al. |

OTHER PUBLICATIONS

Restriction Requirement, U.S. Appl. No. 12/269,744, (Jun. 22, 2011), 6 pages.

Mujtaba, Syed A., "TGn Sync Proposal Technical Specification", *IEEE 802.11-04 / Wireless LANs*, (May 2005), pp. 1-131.

Zhang, Hongyuan et al., U.S. Appl. No. 12/098,222, (Apr. 4, 2008), 78 pages.

Non-Final Office Action, U.S. Appl. No. 12/397,057, (Nov. 9, 2011), 7 pages.

Non-Final Office Action, U.S. Appl. No. 12/510,716, (Nov. 8, 2011), 8 pages.

Non-Final Office Action, U.S. Appl. No. 12/511,606, (Jan. 4, 2012), 6 pages.

Final Office Action, U.S. Appl. No. 12/397,057, (Apr. 27, 2012), 11 pages.

Final Office Action, U.S. Appl. No. 12/510,716, (Jun. 28, 2012), 10 pages.

Non-Final Office Action, U.S. Appl. No. 12/253,078, (Jun. 8, 2012), 18 pages.

Non-Final Office Action, U.S. Appl. No. 12/269,744, (Feb. 16, 2012), 14 pages.

Non-Final Office Action, U.S. Appl. No. 12/574,879, (Jun. 4, 2012), 11 pages.

Final Office Action, U.S. Appl. No. 12/269,744, Sep. 19, 2012, 13 pages.

Final Office Action, U.S. Appl. No. 12/511,606, Sep. 13, 2012, 8 pages.

Non-Final Office Action, U.S. Appl. No. 12/397,057, Aug. 1, 2012, 10 pages.

Final Office Action, U.S. Appl. No. 12/574,879, Nov. 20, 2012, 13 pages.

Non-Final Office Action, U.S. Appl. No. 12/767,922, Nov. 2, 2012, 12 pages.

"Final Office Action", U.S. Appl. No. 12/397,057, Feb. 1, 2013, 13 pages.

"Final Office Action", U.S. Appl. No. 12/253,078, Feb. 13, 2013, 21 pages.

"Non-Final Office Action", U.S. Appl. No. 12/574,879, Apr. 23, 2013, 13 pages.

"Notice of Allowance", U.S. Appl. No. 12/269,744, Apr. 10, 2013, 11 pages.

"Notice of Allowance", U.S. Appl. No. 12/767,922, Apr. 16, 2013, 5 pages.

\* cited by examiner

DEBLOCKING FILTERING

RELATED APPLICATIONS

This application claims priority to U.S. Provisional Patent Application Ser. No. 61/085,995 filed Aug. 4, 2008, U.S. Provisional Patent Application Ser. No. 61/084,340 filed Jul. 29, 2008, U.S. Provisional Patent Application Ser. No. 61/084,422 filed Jul. 29, 2008, and U.S. Provisional Patent Application Ser. No. 61/084,342 filed Jul. 29, 2008, all of the disclosures of which are incorporated by reference herein in their entirety.

BACKGROUND

Some conventional video encoding and decoding techniques have limitations associated with a lack of flexibility common to computer hardware or a lack of speed common to computer software. Some techniques involve computationally expensive or difficult operations, such as fast motion estimation, post-video-compression artifact filtering, and post-video-compression dequantization.

SUMMARY

This summary is provided to introduce subject matter that is further described below in the Detailed Description and Drawings. Accordingly, this Summary should not be considered to describe essential features nor used to limit the scope of the claimed subject matter.

In one embodiment, a method comprises receiving prediction parameters extracted from a decoded video stream, generating, based on the prediction parameters, messages usable for deblocking filtering, and providing the messages.

In another embodiment, a deblocking filter is described that comprises a message generator configured to extract prediction parameters from a decoded video stream and generate, based on the extracted prediction parameters, messages usable for deblocking filtering and a deblocking engine configured to deblocking filter the decoded video stream using the messages.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

As noted in the Background above, conventional video encoding and decoding techniques have numerous difficulties. This disclosure describes tools capable of addressing one or more of these difficulties, including those associated with a lack of flexibility or speed, fast motion estimation, post-video-compression artifact filtering, and post-video-compression dequantization. In the discussion that follows, an example operating environment is described that may incorporate, represent, or be used by the tools. Example methods are also described that may be employed in the example operating environment as well as other environments. These methods are followed by an example System-on-Chip (SoC) environment in which components of FIGS. 1, 3, 5, 7, 9, and 11 may be embodied. In the discussion below, reference will be made to the environments by way of example only. Therefore, implementation of the tools is not limited to the example environments. The term tools as used herein may refer to system(s), method(s), integrated circuit(s), apparatus(es), physical layer(s), SoCs, various other hardware, computer-readable and/or executable instructions, and/or technique(s) as permitted by the context above and throughout the disclosure.

Example Operating Environment

Before describing the tools in detail, the following discussion of an example operating environment is provided to assist the reader in understanding some ways in which various aspects of the tools may be, but are not required to be, employed. The environment described below constitutes one example; other environments may be used without departing from the scope of the claimed subject matter.

Figure 1:
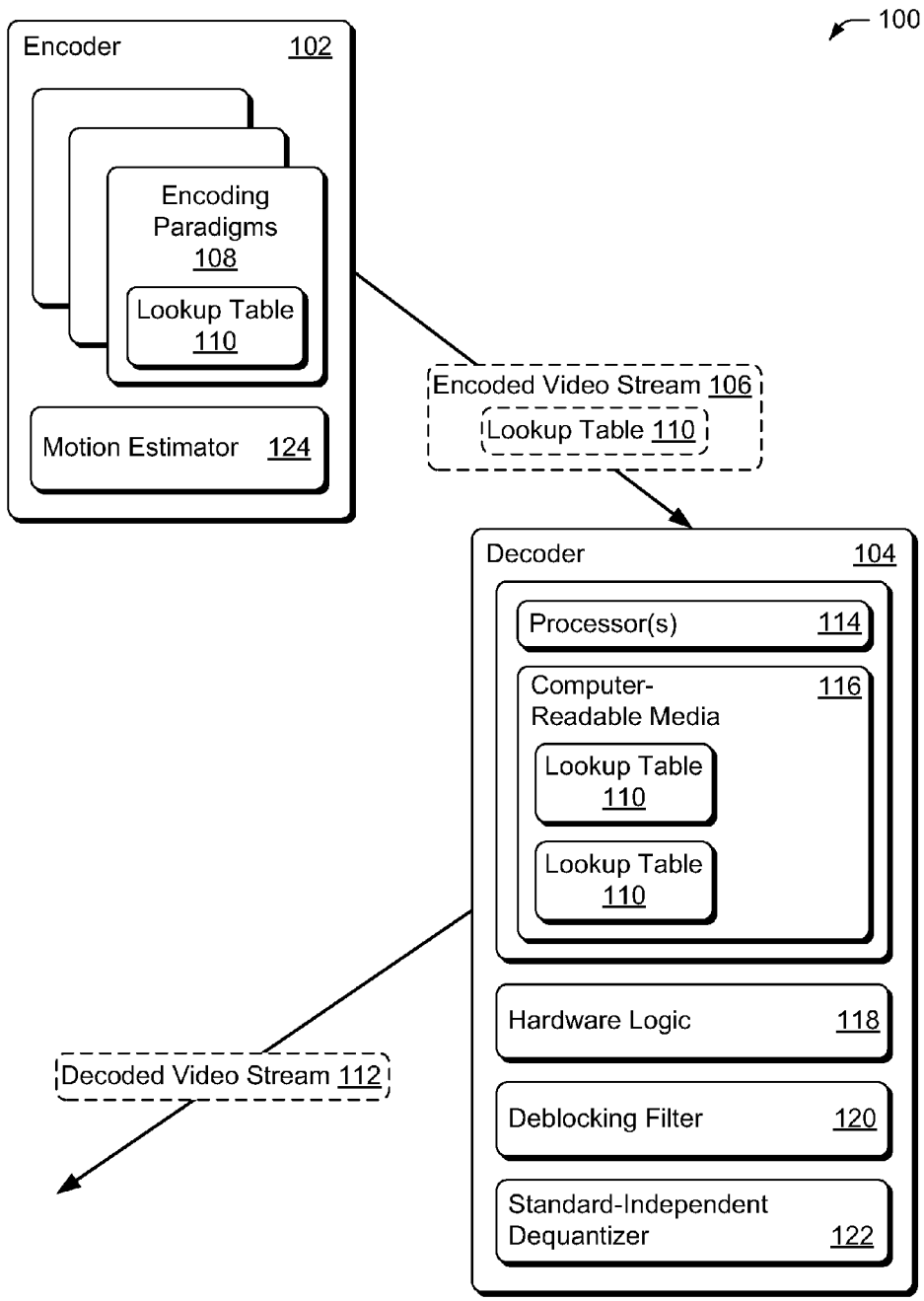
FIG. 1 illustrates an example operating environment configured to enable numerous techniques involved in video coding.

FIG. 1 illustrates one such operating environment generally at 100. The example operating environment includes an encoder 102 and a decoder 104. Encoder 102 encodes video data to provide an encoded video stream 106, which is communicated to decoder 104. While not shown, the video stream can be communicated in many manners, such as through a wireless or landline communication network, e.g., an intranet, the Internet, and/or a cellular-phone network, to name a few.

Encoder 102 is configured to perform various steps by which to encode video data into encoded video stream 106, such as data compression, file format changes, or encryption. These steps follow one or more encoding paradigms 108, each of which may include a lookup table 110 usable to aid in decoding encoded video stream 106. This lookup table 110 is associated with its respective encoding paradigm such that encoded video stream 106 may be decoded using the associated lookup table 110. Decoder 104 decodes an encoded video stream based on the lookup table 110 received rather than be limited to a single paradigm.

Lookup table 110 is received by decoder 104, in this example environment as part of encoded video stream 106. As will be noted in the discussion below, this lookup table 110 can be received in various ways. In this embodiment, lookup table 110 is included as part of a header at or near the beginning of encoded video stream 106.

As shown, decoder 104 is configured to decode encoded video stream 106 into decoded video stream 112. To aid in doing so, decoder 104 includes one or more processors 114, computer-readable media 116, and hardware logic 118. Computer-readable media 116 may include various kinds of media, such as volatile (e.g., Static Random Access Memory, or SRAM) and non-volatile memory. Computer-readable media 116 is shown storing two copies of lookup table 110; the tables may be in one media or each in two separate media, such as two separate SRAMs. As will be described in greater detail below, these elements of decoder 104 operate together to decode encoded video stream 106. Manners in which the tools may decode encoded video streams, including through decoder 104, are set forth in the sections set forth below.

In some embodiments, environment 100 also includes one or more of a deblocking filter 120, a standard-independent dequantizer 122, or a motion estimator 124. Deblocking filter 120 is configured to perform post-processing on decoded video stream 112 to improve image quality, and some ways it may do so are described in the section entitled Deblocking Filtering. Standard-independent dequantizer 122 is configured to perform unified equations based on parameters associated with a coding standard used for a video stream, and some ways it may do so are described in the section entitled Dequantizer. Motion estimator 124 is configured to support categories of fast motion search methods. Some ways in which it may operate and its architecture are described in the section entitled Motion Estimator.

Example Decoding Method

As noted in the Background above, conventional video encoding and decoding have numerous difficulties. Some of these include those associated with a lack of flexibility common to computer hardware or lack of speed common to computer software. Decoding encoded video streams is often difficult for software to perform quickly and for hardware to perform for more than a single type of encoding/decoding algorithm or without significant cost or complexity in the hardware's design. By way of example, consider context-based arithmetic code (CABAC) decoders, which use arithmetic coding to decode a video bit-stream into individual bit strings. This type of decoding uses lookup tables, which are conventionally stored in hardware. By using hardware the decoders, while often quick to decode a bit string, are complex, expensive, and/or have a risky design. These decoders are also inflexible because they typically store one lookup table and thus cannot easily handle different coding paradigms. This disclosure describes tools capable of decoding encoded video streams using a combination of hardware and software, which provides speed and flexibility.

The following discussion describes methods that may be implemented utilizing the previously described environment. Aspects of these methods may be implemented in hardware, firmware, software, or a combination thereof. The methods are shown as a set of blocks that specify operations performed by one or more entities and are not necessarily limited to the order shown for performing the operations by the respective blocks.

Figure 2:
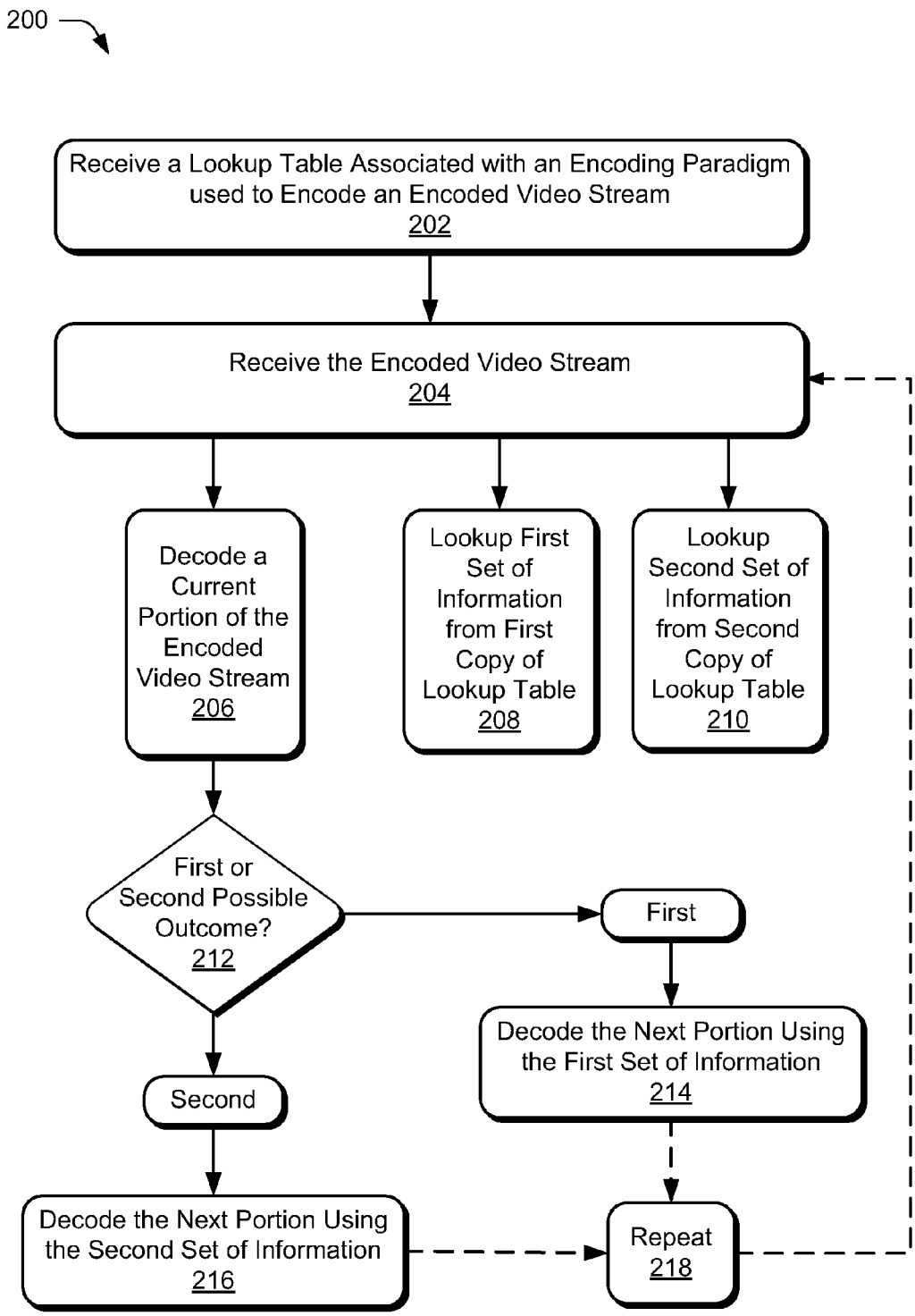
FIG. 2 is a method that enables decoding of an encoded video steam using lookup tables.

FIG. 2 depicts a method 200 in an example implementation in which the tools enable decoding of an encoded video steam. In this example implementation, an encoded video stream is received that follows a particular encoding paradigm and that can be decoded according to that paradigm. This coding paradigm uses at least some information from a current decoding operation to perform a later decoding operation, such as when an outcome of decoding a current portion of an encoded video stream affects actions or information used to decode a later portion of the encoded video stream.

At block 202, the tools receive a lookup table associated with an encoding paradigm used to encode an encoded video stream. By way of example, consider lookup tables 110-0 and 110-1 shown in FIG. 3. Lookup tables 110-0 and 110-1 are examples and copies of lookup table 110 associated with the encoding paradigm. These tables may be data structures (e.g., arrays) that permit memory retrieval of information usable to decode data encoded using a particular encoding paradigm.

Inputs 302-0 and 302-1 can be provided to lookup tables 110-0 and 110-1, respectively, such as by hardware logic 118 of FIG. 1. These inputs may include or be based on one of two different possible results of a current decoding operation, such as zero or one. In response, the lookup tables provide output 304 and output 306 from tables 110-0 and 110-1, respectively. These outputs are often different because the inputs given to the tables are different, even though the lookup tables may be identical. One of these two output will be used in further decoding operations and include one or more state variables, a most-probable symbol, or context numbers.

These lookup tables are represented with inputs and outputs rather than as columns and rows of information, though the lookup tables may include such a data structure. Here subordinate lookup tables 308, 310, and 312 are included within each of the lookup tables 110-0, 110-1. Subordinate lookup table 308 may, based on all or a portion of the input received, output a syntax element value and an end of string indicator. Subordinate lookup table 310 may, based on all or a portion of the input received, output one of three or more mode indicators (indicating a particular decoding mode). Similarly, subordinate lookup table 312 may, based on all or a portion of the input received, output context numbers, such as a next context index. Further information on how lookup tables may be used is set forth elsewhere herein.

At block 204, the tools receive the encoded video stream. Blocks 202 and 204 may occur nearly contemporaneously, such as when the lookup table is received as part of a header of the encoded video stream. By way of example, consider FIG. 1, where decoder 104 receives lookup table 110 as part of a header of encoded video stream 106 received from encoder 102.

At block 206, the tools decode a current portion of the encoded video stream. To do so, the tools may use one of numerous types of decoding algorithms. In the example of FIG. 1, decoder 104 includes hardware logic 118. This hardware logic 118 may operate in conjunction with lookup table 110, such as with hardware logic following a CABAC decoding algorithm usable with multiple encoding paradigms 108.

Figure 4:
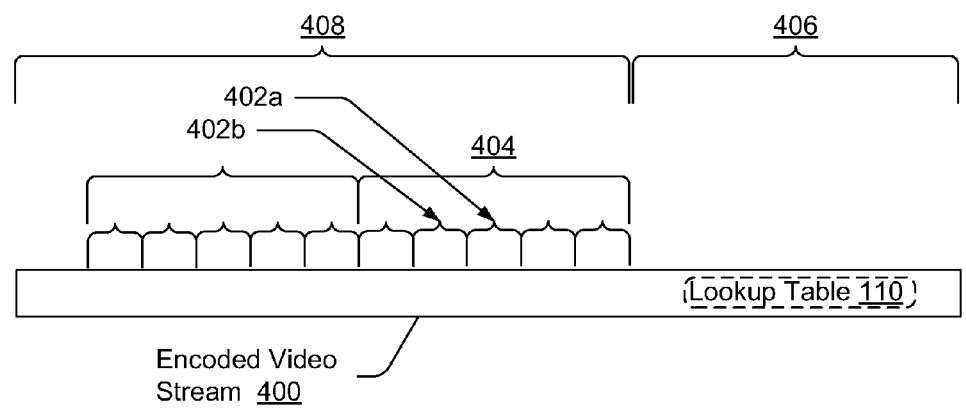
FIG. 4 illustrates an example encoded video stream having a header and encoded video data.

The current portion decoded at block 206 may be a single bin of the encoded video stream and stand alone or be part of a subsection of the encoded video stream. By way of example, consider example encoded video stream 400 of FIG. 4. In this example, the current portion is a single bin 402a and a next portion is a single bin 402b that is adjacent to and immediately after bin 402a. Each of bins 402a, 402b has a single bit. The subsection is a bin string 404 of the example encoded video stream 400. Note that FIG. 4 illustrates stream 400 having a header 406 and encoded video data 408. Header 406 includes lookup table 110 while encoded video data 408 includes numerous bin strings 404 (two shown) each having numerous bins 402.

At blocks 208 and 210, the tools lookup different sets of information from two copies of a lookup table. One of these sets of information will be used later to aid in decoding a next portion of the encoded video stream. Blocks 208 and 210 are performed approximately during block 206, namely the decoding operation of the current portion of the encoded video stream. Blocks 208 and 210 can be performed at once, in parallel, and/or even serially so long as both are performed prior to or at approximately the same time as completion of a decoding operation of the current bin of the encoded video stream.

Continuing the ongoing example, decoder 104 looks up information usable to aid in decoding a next bin 402b of encoded video stream 400 for two possible outcomes of the decoding operation of current bin 402a. As shown in FIG. 1, decoder 104 may look up this information from two copies of lookup table 110—one set of information from each copy of the lookup table. Hardware logic 118 of decoder 104 may perform the decoding of blocks 206 and 214 or 216 in one cycle and look up both sets of information at blocks 208 and 210 in one more cycle, thereby enabling the method to decode a portion of encoded video stream 106 or 400 in two cycles.

Figure 3:
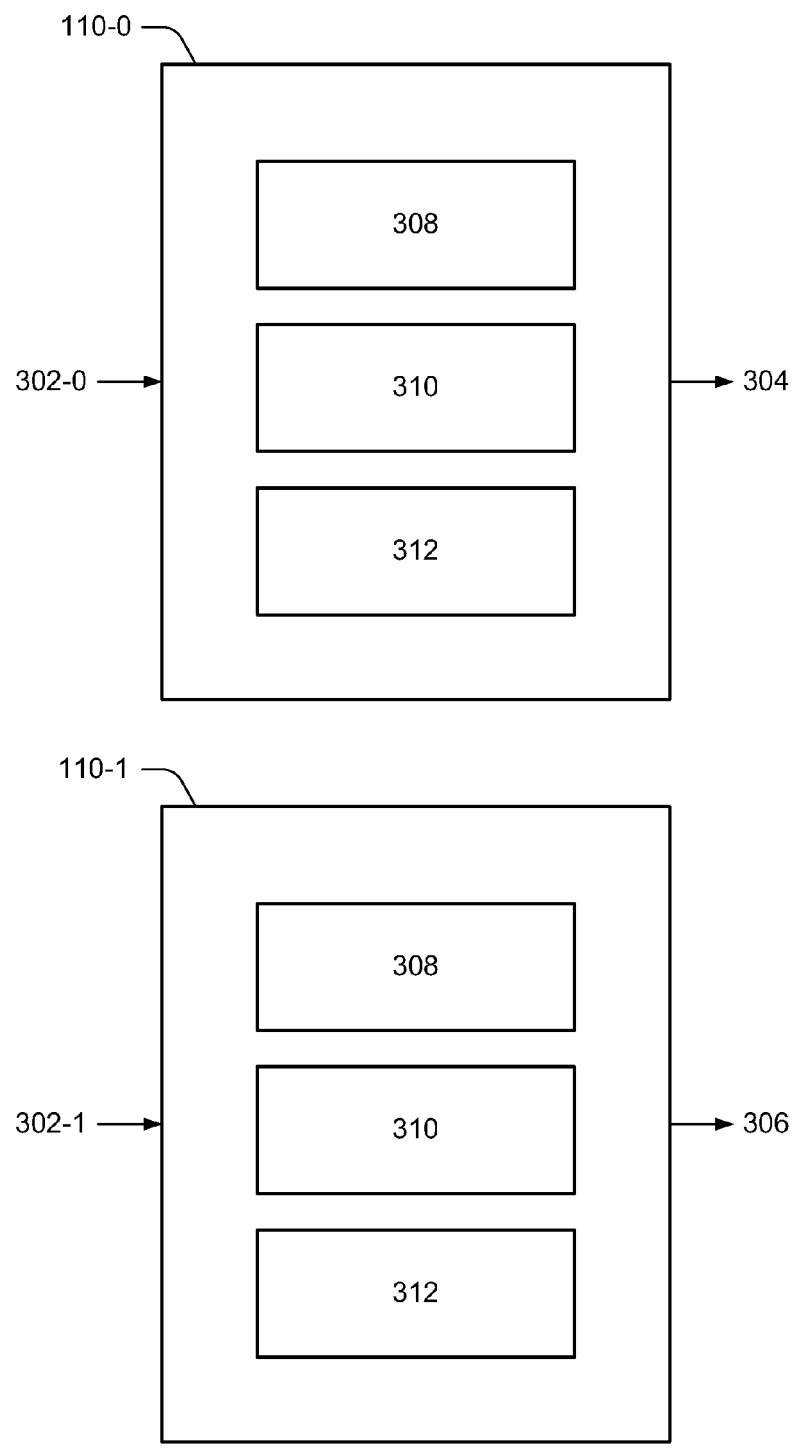
FIG. 3 illustrates example lookup tables having subordinate lookup tables.

Returning to the example lookup tables 110-0 and 110-1 of FIG. 3, consider that inputs 302-0 and 302-1 each include or are based on a binary component, namely zero and one, respectively. The provided binary component is one value for the first copy of the lookup table and another value for the second copy of the lookup table. With this input a first copy of the lookup table will provide output 304. With this other input a second copy of the lookup table will provide a different output 306. Thus, hardware logic 118 provides input to lookup tables 110-0 and 110-1 and then receives different outputs. This output is usable by hardware logic 118 to continue to decode the encoded video stream depending on the outcome of decoding a current portion of the encoded video string.

Outputs 304 and 306 may include information concerning state variables, a most-probable symbol, and context numbers, to name a few. Example outputs are described in greater detail herein, including in the section entitled Example Hardware Logic and Software Lookup Table.

At block 212, the tools complete decoding of the current portion of the encoded video stream. As part of decoding a portion of the encoded video stream, such as a particular bin, many encoding paradigms are structured to provide either a zero or one for the result because a binary value in most computer languages is either a zero or a one. Thus, based on one or more bits of data of encoded video stream 106 of FIG. 1, decoder 104 may determine that a portion of decoded video stream 112 should be a zero or one.

If the first outcome, the tools proceed along the first path to block 214. If the second outcome, the tools proceed along the second path to block 216. The tools use the first set of information (e.g., output 304) to decode the next portion of the encoded video stream at block 214 if the first possible outcome is found to be true (e.g., zero). Alternatively, the tools use the second set of information (e.g., output 306) to decode the next portion of the encoded video stream at block 216 if the second possible outcome is found to be true (e.g., one). At block 214 or 216, decoder 104 decodes next bin string 402b using hardware logic 118 and one or more processors 114 executing lookup table 110.

Returning to FIG. 4, consider that if current bin 402a is decoded resulting in either the first or second outcome, decoder 104 may use the available information, namely the first or second set of information, to decode next bin 402b. Note that both sets of information are readily available for use by decoder 104 and as such, decoder 104 may proceed to decode next bin 402b without waiting for a lookup of the set of information usable to aid in decoding next bin 402b.

The tools may proceed to block 218 to repeat various blocks of method 200. For example, the tools can decode the next portion of the encoded video stream by performing block 214 or 216 instead of block 206 and, while performing the decoding, lookup new sets of information from the copies of the lookup table. By so doing, the tools are ready to decode another portion of the encoded video stream after the next portion has been decoded. The results of this ongoing method 200 include a decoded video stream, such as decoded video stream 112 of FIG. 1.

Example Hardware Logic and Software Lookup Table

As noted more generally above, a decoder may operate using hardware logic and software lookup tables to decode an encoded video stream quickly and flexibly. In this section an example decoder is described that includes a particular type of hardware logic and media to store lookup tables. This example decoder is provided to further describe the tools; it is not intended to limit the scope of the tools to this example decoder. Other forms of hardware logic and media may also be used.

Figure 5:
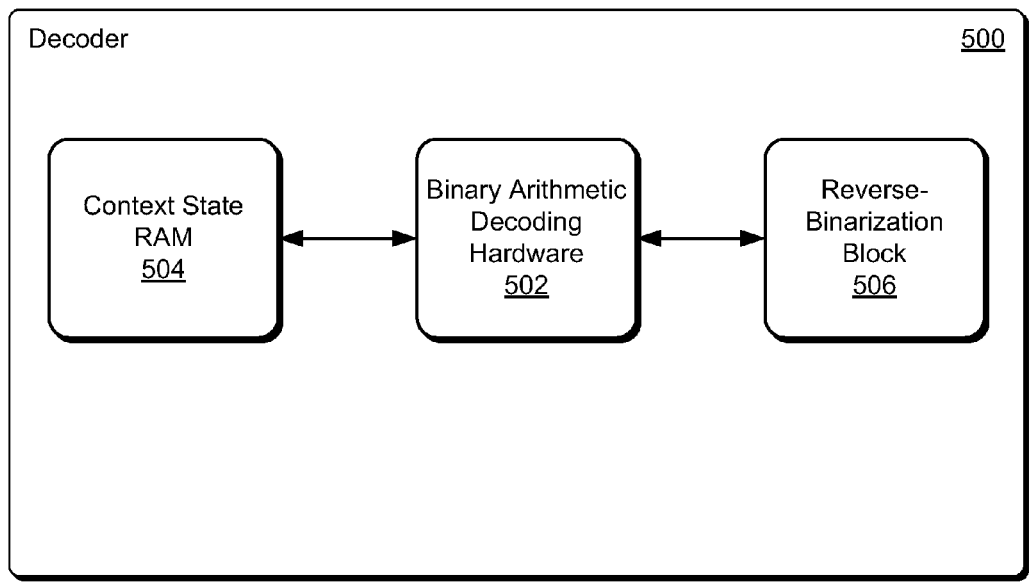
FIG. 5 illustrates an example decoder having binary arithmetic decoding hardware, context state RAM, and a reverse binarization block.

FIG. 5 illustrates an example decoder 500 having binary arithmetic decoding hardware 502, context state RAM 504, and a reverse binarization block 506. This example decoder 500 is configured for H.264 video decoding (a video compression standard, also known as MPEG-4 Part 10 or MOEG-4 AVC) following context-based arithmetic code (CABAC) decoding. Binary arithmetic decoding hardware 502 communicates to and from context state RAM 504 and reverse-binarization block 506 (shown with arrows). Binary arithmetic decoding hardware 502 uses arithmetic coding to decode an encoded video stream into bin strings, each of which represents an intermediate syntax element (SE). To obtain a final syntax element value (SEV) this SE is mapped. The mapping process from the SEV to its corresponding SE is called reverse binarization, which here is performed with reverse-binarization block 506 using a set of lookup tables.

To decode a bin, binary arithmetic decoding hardware 502 uses information, including state variables, a most-probable symbol, and context numbers. These context numbers represent possible outcomes of decoding a current bin. Binary arithmetic decoding hardware 502 stores and accesses the state variables, the most-probable symbol, and the context numbers to and from context state RAM 504 (e.g., SRAM). While binary arithmetic decoding hardware 502 decodes the current bin, it updates the state variables and the most-probable symbol in the SRAM. Decoder 500 does not know which of the two context numbers represents the actual outcome of decoding the current bin until the current bin is decoded.

Note that the bin-decoding process results in one of two possible context numbers, such as one or zero. Thus, even though the decoding process may use multiple steps, such as renormalization, updating state variables, updating the most-probable symbol, and other actions, there are two possible results. Decoding an encoded bit that is a zero or a one results in a decoded bit that is either a zero or a one. Binary arithmetic decoding hardware 502, because it knows of all possible outcomes of decoding the current bin (here one or zero), looks up information usable in decoding a next bin during the decoding of the current bin. Binary arithmetic decoding hardware 502 may do so from two lookup tables stored in context state RAM 504. By so doing, information used to decode a next bin is available as soon as the result of the previous bin is found. This permits decoder 500 to forgo dead cycles between consecutive bin-decoding phases. This also permits decoding of a bin by binary arithmetic decoding hardware 502 in two cycles, a first cycle to perform table lookups (and other tasks) and a second cycle to determine the result, update the state variables, and perform renormalization.

Deblocking Filtering

As noted in the Background above, conventional video encoding and decoding have numerous difficulties. Some of these difficulties come from computationally expensive or difficult operations, such as post-video-compression artifact filtering. Video-compression techniques, such as intra prediction, quantization, and motion compensation often introduce artifacts into the decompressed video. These artifacts can reduce the visual quality of the video. The artifacts are most easily noticed, and thus reduce the perceived quality of the video, at edges of blocks. Blocks are two-dimensional groups of pixels, grouped by data-processing units.

To correct these artifacts, or at least reduce the perceived loss in video quality caused by the artifacts, some conventional codecs perform a post-processing technique called deblocking filtering. This filtering technique is highly nonlinear and involves complicated decision-making, which makes performing it slow or processor-intensive. This disclosure describes tools capable of speeding up this and similar filtering techniques. The tools generate messages used in filtering techniques based on prediction parameters extracted from a video stream.

These tools will be described in the context of various environments, such as FIG. 1, though aspects may be implemented in various hardware, firmware, software, or a combination thereof. A method is shown as a set of blocks that specify operations performed by one or more entities and is not necessarily limited to the order shown for performing the operations by the respective blocks.

Figure 6:
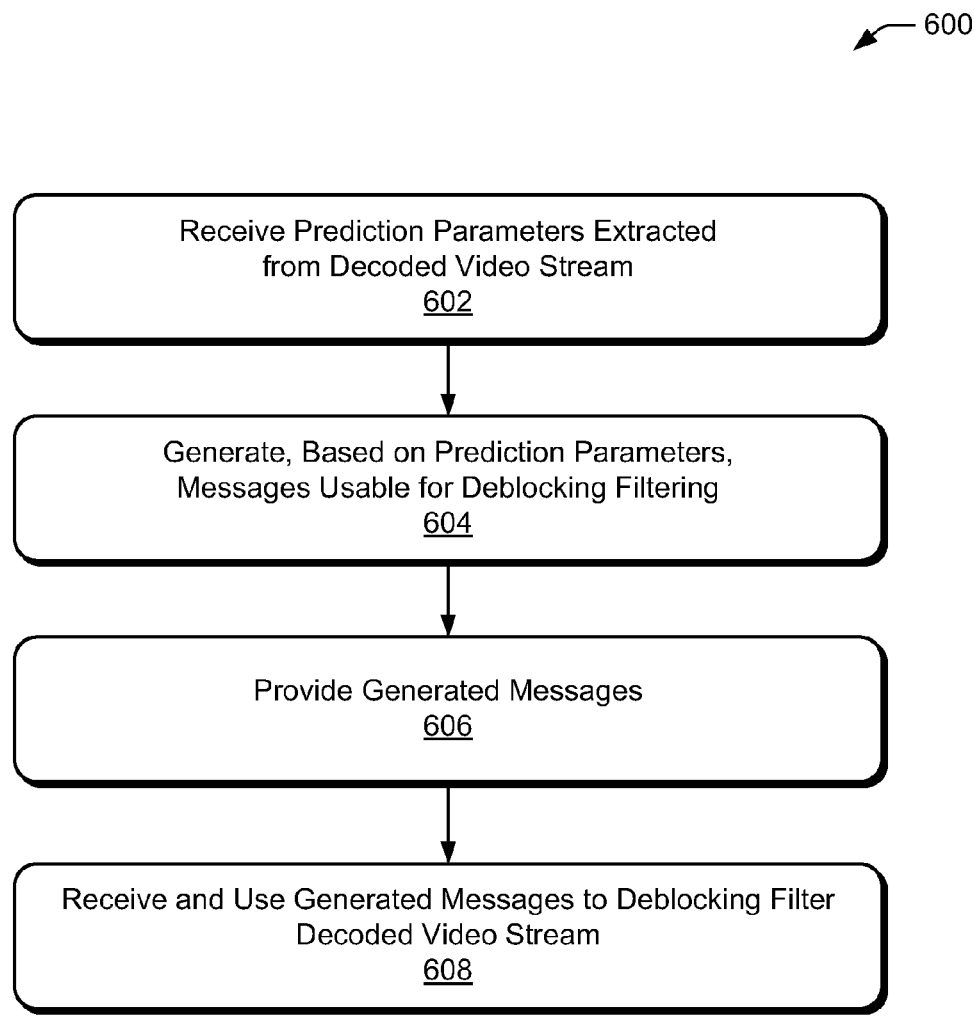
FIG. 6 is a method that enables deblocking filtering of a decoded video steam.

FIG. 6 depicts a method 600 in an example implementation in which the tools enable deblocking filtering of a decoded video steam. In this example implementation, the filtering is a post-processing technique used on a decoded video stream to change the perceived (and in some cases actual) quality of video rendered using that video stream.

At block 602, the tools receive prediction parameters extracted from a decoded video stream. The tools may act through deblocking filter 120 of decoder 104, in which case deblocking filter 120 receives prediction parameters extracted from decoded video stream 112. These extracted prediction parameters can include picture-level parameters, macro-block-level parameters (macro blocks are blocks of 16, 4×4 blocks), macro-block QP (a quantized scaled factor) parameters, and block-level parameters, to name a few.

Figure 7:
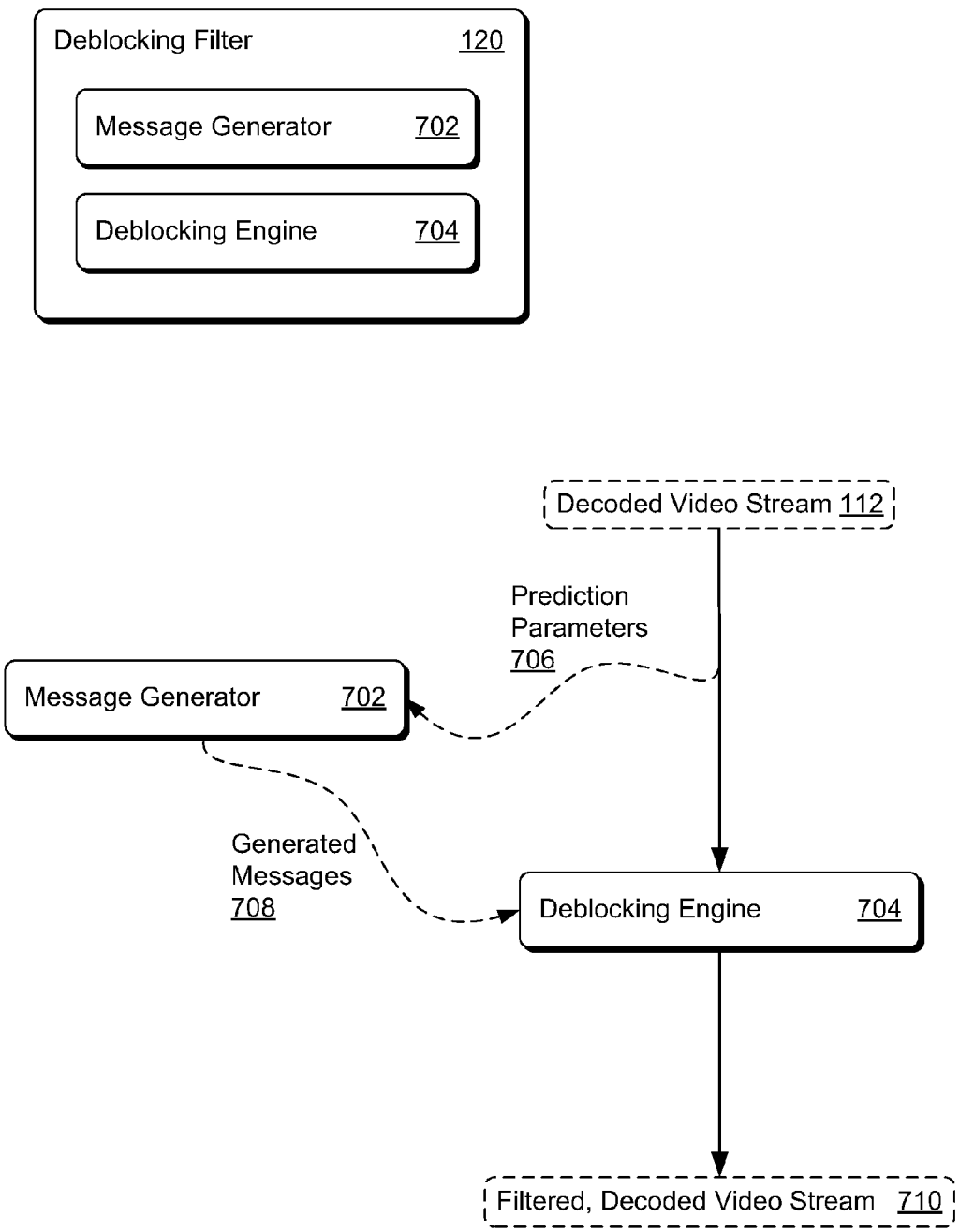
FIG. 7 illustrates a detailed example of the deblocking filter shown in FIG. 1.

For greater detail, consider example deblocking filter 120 shown in FIG. 7, which includes message generator 702 and deblocking engine 704. Message generator 702 is shown receiving prediction parameters 706 extracted from decoded video stream 112.

Figure 8:
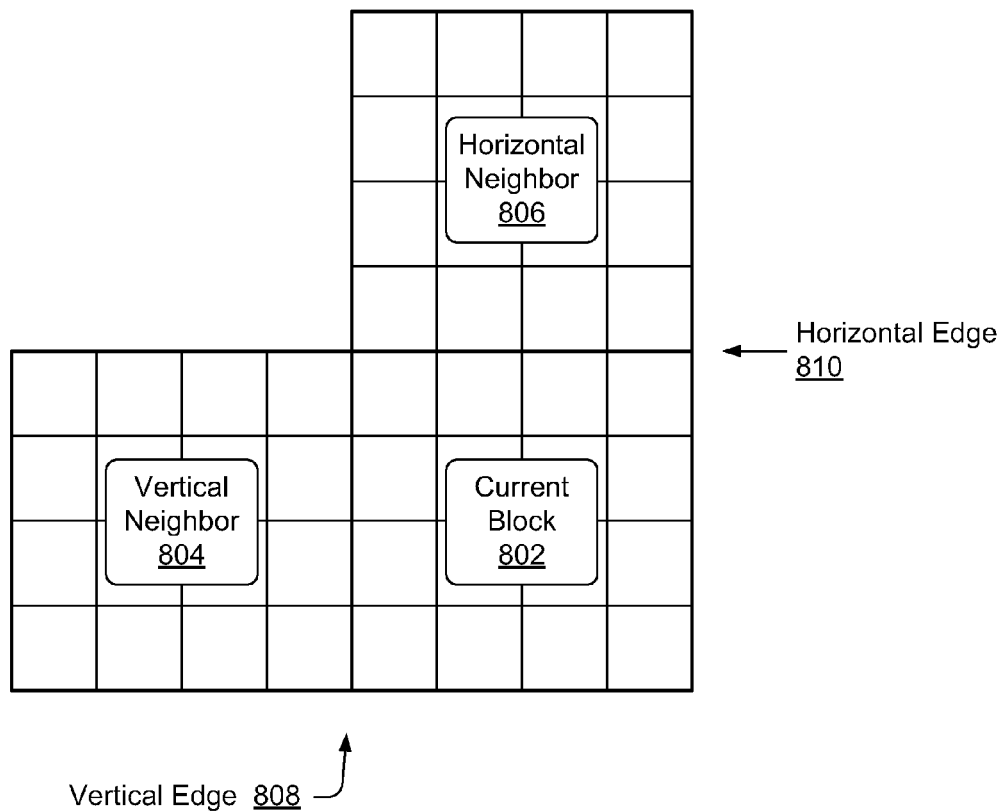
FIG. 8 illustrates 4×4 pixel blocks including a current block, vertical neighbor block, and horizontal neighbor block.

At block 604, the tools generate, based on the prediction parameters, messages usable for deblocking filtering. Continuing the ongoing example, message generator 702 generates messages 708 based on prediction parameters 706. The tools can generate these messages in various different manners. In the context of H.264, the tools may use message generator 702 to calculate loop filter parameters based on properties of neighboring blocks of pixels. Neighboring blocks share a vertical and horizontal edge of a current block that is decoded but not yet filtered and for which the messages are usable for deblocking filtering. For example, see FIG. 8, which illustrates a current block 802, a vertical neighbor 804, and a horizontal neighbor 806. All three of these blocks represent a 4×4 block of pixels. Note that vertical block 804 is oriented horizontal to current block 802 but is called vertical because it shares a vertical edge 808. Similarly, horizontal neighbor 806 shares a horizontal edge 810 with current block 802.

These calculated loop filter parameters include boundary strength, alpha, beta, and edge threshold values (called Tc0). In the context of H.264, the tools may calculate boundary strength parameters based on information about macroblock edges of neighboring macroblocks, intra-coding, and frame coding, though the tools may forgo calculating boundary strength parameters in cases where block edges are determined to not require block filtering. The tools may calculate alpha and beta loop filter parameters using lookup tables based on data extracted from a decoded video stream, such as the location of the block (e.g., whether the block is a left or vertical neighbor block, top or horizontal neighbor block, or current block). Edge threshold values can be found using a two-dimensional lookup table and based on the calculated boundary strength and either the alpha parameter or the beta parameter. If the boundary strength is zero, however, the edge threshold value is also zero (no lookup table is needed in this case).

The loop filter parameters are included in the generated messages provided to deblocking engine 704 and calculated at vertical and horizontal edges, such as 808 and 810, respectively. The tools generate these loop filter parameters based on prediction parameters extracted from a decoded video stream. Note that loop filter parameters can be calculated for all vertical and horizontal edges with all possible neighboring blocks.

As is shown in this particular example in the context of H.264, message generator 702 may include or rely on lookup tables stored in computer-readable media and through execution by one or more processors. Examples of this can be seen in FIG. 1. Note also that deblocking filter 120, while it uses some software, may rely on hardware logic (e.g., hardware logic 118 of FIG. 1) to perform calculations with speed and efficiency.

At block 606, the tools provide the messages. These messages, as noted above, include calculated loop filter parameters for vertical and horizontal edges of neighboring blocks. The messages are usable for deblocking filtering, such as for filtering artifacts from the decoded video stream from which the prediction parameters are extracted at block 602. Continuing the above example, deblocking filter 120 shown in FIG. 7 includes message generator 702 and deblocking engine 704. In this case message generator 702 provides generated messages 708 to deblocking engine 704. Deblocking engine 704 then uses generated messages 708 to deblocking filter decoded video stream 112 at block 608. The result is a filtered, decoded video stream 710. While this example of FIG. 7 shows message generator 702 and deblocking engine 704 integrated into deblocking filter 120, they may also be separate entities.

Motion Estimator

In the not-too-distant past, video media, such as television and movies, were stored in analog format. This analog format was typically magnetic tape. With the advent of the digital age, however, video media is stored and transferred most often in digital format. Video media in a digital format often requires significant resources to store and transfer. Because of this, digital media is often compressed to reduce storage and transfer resources and then decompressed prior to use.

Some video encoders compress digital media in part using motion-estimation processes. These motion-estimation processes may reduce computing resources used in storing and transferring digital media by relating part of a current image, such as part of a movie frame, to part of a future image, such as part of the next frame of the movie. These relations between a current image and future image can allow encoders to store and transfer an image or piece of an image based on the relationship between the current image and the future image rather than store or transfer more (or all) of the future image. The encoders store or transfer less of the future image by using parts of the current image and some relationship indicating where in the future image the part of the current image should be displayed.

Consider the following example of motion estimation. Assume a movie shows a person's hand in a current frame at a particular location on a screen. In the next frame assume the hand has moved slightly to the right. Rather than store and transfer data representing the next frame's rendering of the hand in its position slightly to the right of the position of the hand in the current frame, codecs (a term for a combined encoder and decoder) may instead store that the current data representing the hand should be displayed in the next frame slightly to the right. Simplistically, then, encoders permit use of fewer storage or transmission resources than simply storing and displaying every image in digital video media. With the increasing resolution of many video-media programs, such as high-definition (HD) television and BlueRay™ movies, motion-estimation processes are themselves consuming significant resources. These resources may include hardware computational processing units (CPUs) and memory caches. Not only is this consumption of resources problematic generally, in many cases they prevent motion-estimation processes to be used with current hardware designs or to display digital media in real time.

The tools, however, enable fast motion estimation even for digital media that requires significant memory and transmission resources, such as media programs in HD, BlueRay™, or other high-resource video media.

Figure 9:
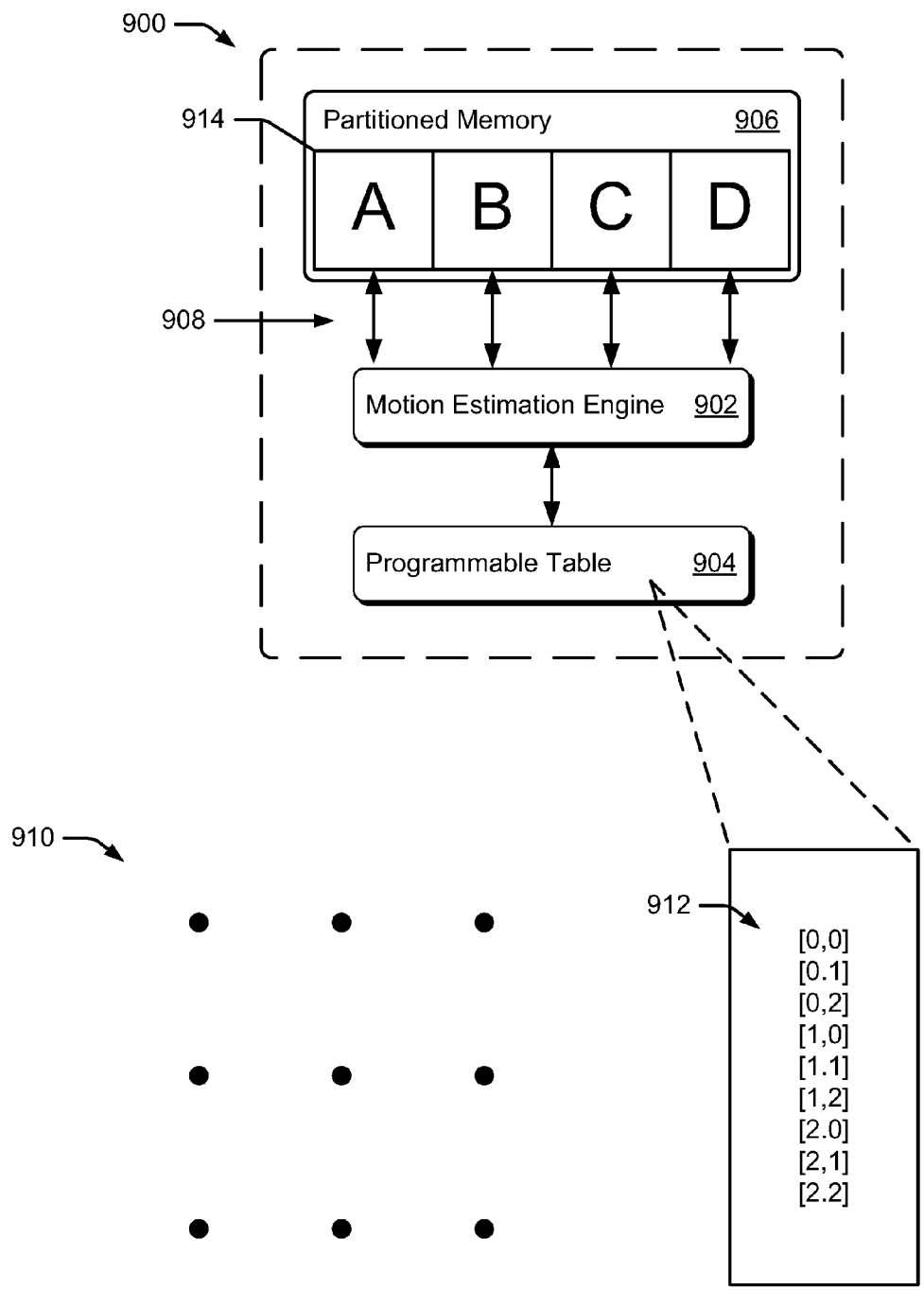
FIG. 9 illustrates an example embodiment of the motion estimator of FIG. 1 having partitioned memory, a motion estimation engine, and a programmable table.

By way of example, consider an embodiment of motion estimator 124, shown in FIG. 9 at 900. Motion estimator 900 includes a motion estimation engine 902, a programmable table 904, a partitioned memory 906, and a memory interface 908.

Motion estimation engine 902 includes a hardware architecture, permitting it to perform operations quickly compared to fully software motion-estimation techniques. Programmable table 904 includes a search pattern and convergence conditions, which describe sets of motion vector candidates to search relative to a previously best candidate and programmable convergence conditions, such as a number of points searched, low cost thresholds, and whether or not the best candidate falls in a center of a current search pattern.

Programmable table 904 permits motion estimator 124 to be programmed to follow a particular search pattern, such as a square, diamond, hexagon, or cross pattern. These and other patterns may be particularly useful or appropriate for a particular kind of video media. Whatever the case, the programmable search pattern permits motion estimator 124 to be flexible, in contrast to some current hardware motion-estimation techniques, and comparatively fast, in contrast to some current software motion-estimation techniques. The programmable convergence conditions can enable flexibility as well.

Consider search pattern 910, which is a 3×3 square having nine points at which motion estimation engine 902 searches. If the center point is the most accurate of the nine points, the convergence conditions indicate that the search may end. If a different point is the best match, the convergence conditions indicate that another search should be performed, such as another 3×3 square centered around the most-accurate point found in the previous iteration. Coordinates corresponding to a first iteration of the search are shown at 912 stored in programmable table 904. The convergence conditions may also be stored in programmable table 904 (not shown).

Figure 10:
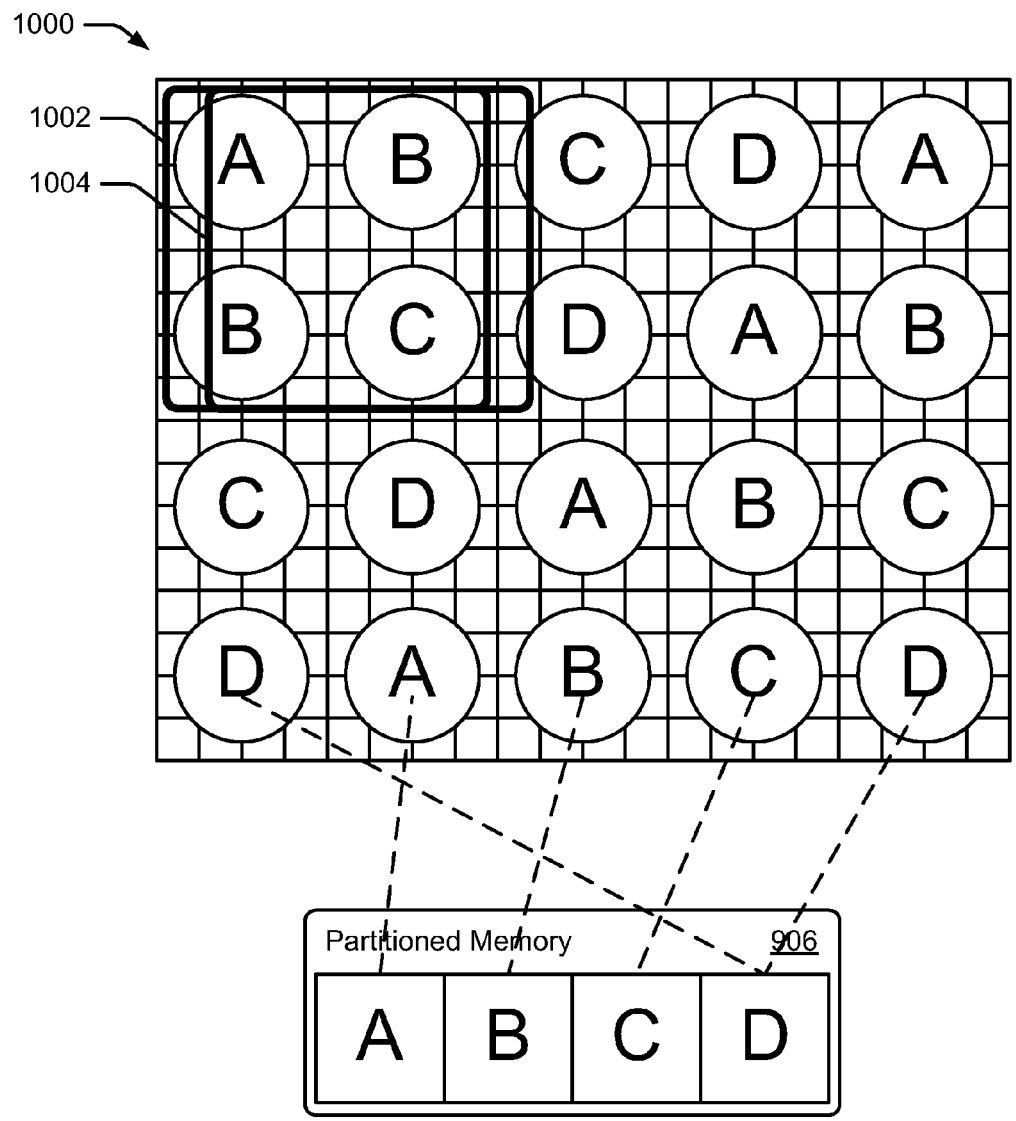
FIG. 10 illustrates a reference frame partitioned based on the partitioned memory of FIG. 9.

Partitioned memory 906 stores reference pixels used by motion estimation engine 902. Each partition 914 holds sets of pixels, such as some number of 4×4 blocks. The partitions are labeled A, B, C, and D, which correspond to a reference frame 1000 shown in FIG. 10. Reference frame 1000 is broken into 4×4 blocks, each of which are labeled in FIG. 10 based on which partition 914 of partitioned memory 906 the corresponding data for those pixels is stored. For visual clarity this storage relationship is shown with dashed lines for only the bottom row.

These blocks are used by motion estimation engine 902 to determine a most accurate point (here the point representing a 4×4 block of reference pixels) compared to a current block of pixels for which encoding using motion estimation is desired. This measure of accuracy can be made in various manners, such as the set of pixels of a reference frame (block or combination of blocks) that have a least Sum of Absolute Difference (SAD) with those of the current block of pixels.

Partitioned memory 906 stores blocks of reference frame 1000 such that the search pattern uses, for each ongoing iteration, as few as one memory cycle. One memory cycle is sufficient because only different memory partitions of partitioned memory 906 are needed for each ongoing iteration of the search. Assume, for example, that the search moved from a first iteration shown at 1002 to a second iteration at 1004 (each of these can be conceptualized as a search window). When moving from A, B, B, C to also require data concerning pixels of C, D, each of partitions C and D is configured, through memory interface 908, to provide the data in one cycle.

A diagonal movement in the search, as well as a first search, may use two memory cycles because such a search involves two sets of data from a same partition (e.g., for first iteration 1002 two sets of data from partition B). With the illustrated reference frame and memory partition allocation, however, search patterns that move vertically or horizontally use only one memory cycle. This permits motion estimator 900 to operate quickly and efficiently.

Note that other memory partitions and allocation of reference frames to that memory may also be used, which may permit use of only one memory cycle for search patterns that are not horizontal or vertical, though for brevity these are not shown.

Thus, memory interface 908 is configured to provide pixel data in one memory cycle for each of partitions 914. By so doing, memory interface 908 supports fast incremental updates of reference pixels to be used for evaluating current motion-vector candidates.

The described embodiment of motion estimator 124 provides but one example of a motion estimator that permits motion estimation that is fast enough for real-time motion estimation processes while supporting categories of fast motion search methods. While motion estimator 124 is shown as part of encoder 102 of FIG. 1, in some cases decoder 104 is capable of encoding as well (e.g., is a codec). In these cases decoder 104 can include motion estimator 124, as well as other elements of encoder 102.

Dequantizer

Encoders following the MPEG, H.264, or VC-1 coding standard may necessitate post-video-compression dequantization. Each of these standards, however, uses dequantization techniques that are incompatible with the other dequantization techniques. This makes hardware development difficult or expensive if the hardware is intended to perform dequantization on more than one format of coding. This disclosure addresses this problem with tools that enable dequantization for more than one video standard. The tools may do so with a set of unified dequantization equations using adjustable parameters. The set of unified dequantization equations can enable dequantization for more than one video standard through use of parameters associated with each video standard.

Figure 11:
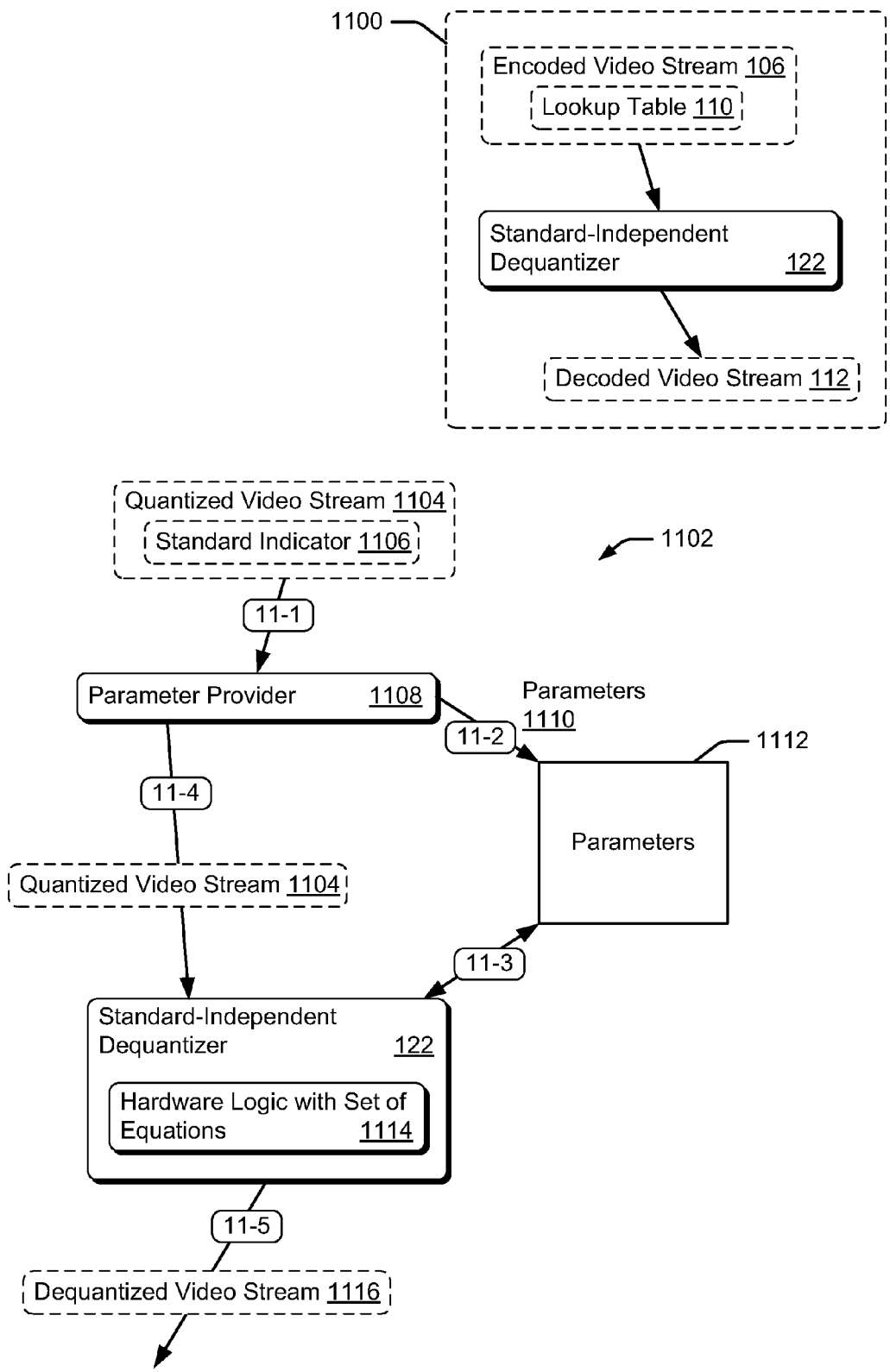
FIG. 11 illustrates an example dequantization method and applicable elements used in this method.

As shown in FIG. 1 and in part in FIG. 11 at 1100, standard-independent dequantizer 122 dequantizes a video stream encoded using one of various coding standards (encoded video stream 106), which uses a particular quantization technique. Standard-independent dequantizer 122 then provides decoded video stream 112.

Standard-independent dequantizer 122 is configured to perform a set of unified equations that apply to multiple quantization techniques based on parameters associated with the coding standard used for the video stream. These parameters may be stored in various locations, including computer-readable media such as computer readable media 116 of FIG. 1, which may be stored in anticipation of the coding standard used or received with the video stream. In one such case, the parameters are received as part of the header of an encoded video stream, such as in lookup table 110 of encoded video stream 106 shown in FIG. 1 or header 406 of FIG. 4.

FIG. 11 expands and further illustrates the more-general example shown at 1100 to describe an example dequantization method and applicable elements used in this method at 1102. Method and elements 1102 include a quantized video stream 1104 including a standard indicator 1106, a parameter provider 1108, standard-dependent dequantization parameters 1110, table 1112, standard-independent dequantizer 122 having hardware logic with a set of unified equations 1114, and dequantized video stream 1116.

Quantized video stream 1104 is received by parameter provider 1108 at arrow 11-1. Quantized video stream 1104 may first be parsed by another entity (e.g., a video stream parser) or parsed by parameter provider 1108, in either case parameter provider 1108 determines and then provides standard-dependent dequantization parameters 1110 to table 1112 (for use by standard-independent dequantizer 122) at arrow 11-2. Parameter provider 1108 bases this determination on standard indicator 1106, which may explicitly indicate the standard and/or dequantization technique used. In this case, parameter provider 1108 may access standard-dependent dequantization parameters 1110 from some memory source and provide these to table 1112. In some other cases, standard indicator 1106 may include parameters 1110, in which case parameter provider 1108 may simply save these to table 1112. In some cases parameter provider 1108 analyzes the structure or metadata of quantized video stream 1104 to determine the quantization technique used and thus the appropriate parameters to provide.

At arrow 11-3, standard-independent dequantizer 122 receives or retrieves parameters 1110 from table 1112. At arrow 11-4, standard-independent dequantizer 122 receives quantized video stream 1104, here after being parsed by parameter provider 1108. At this point standard-independent dequantizer 122 has the video stream and the parameters usable to dequantize that stream. Hardware logic 1114, which includes the set of unified equations, dequantizes the video stream at arrow 11-5. Hardware logic 1114 may dequantize video data quantized using at least any of the following quantization techniques: DC coefficient (associated with some types of MPEG 1, 2, and 4), AC coefficient (associated with some types of MPEG 1, 2, and 4), and generic uniform reconstruction (associated with H.264).

These standard-dependent parameters are provided such that the unified set of equations used by hardware logic 1114 dequantize differently based on the parameters received. For example, these parameters may include picture-level parameters, macroblock-level parameters, macroblock QP (a quantized scale factor) parameters, and command-level parameters. These parameters, however, may be consolidated or pre-processed into parameters 1110 prior to being stored in table 1112.

System-on-Chip Example

Figure 12:
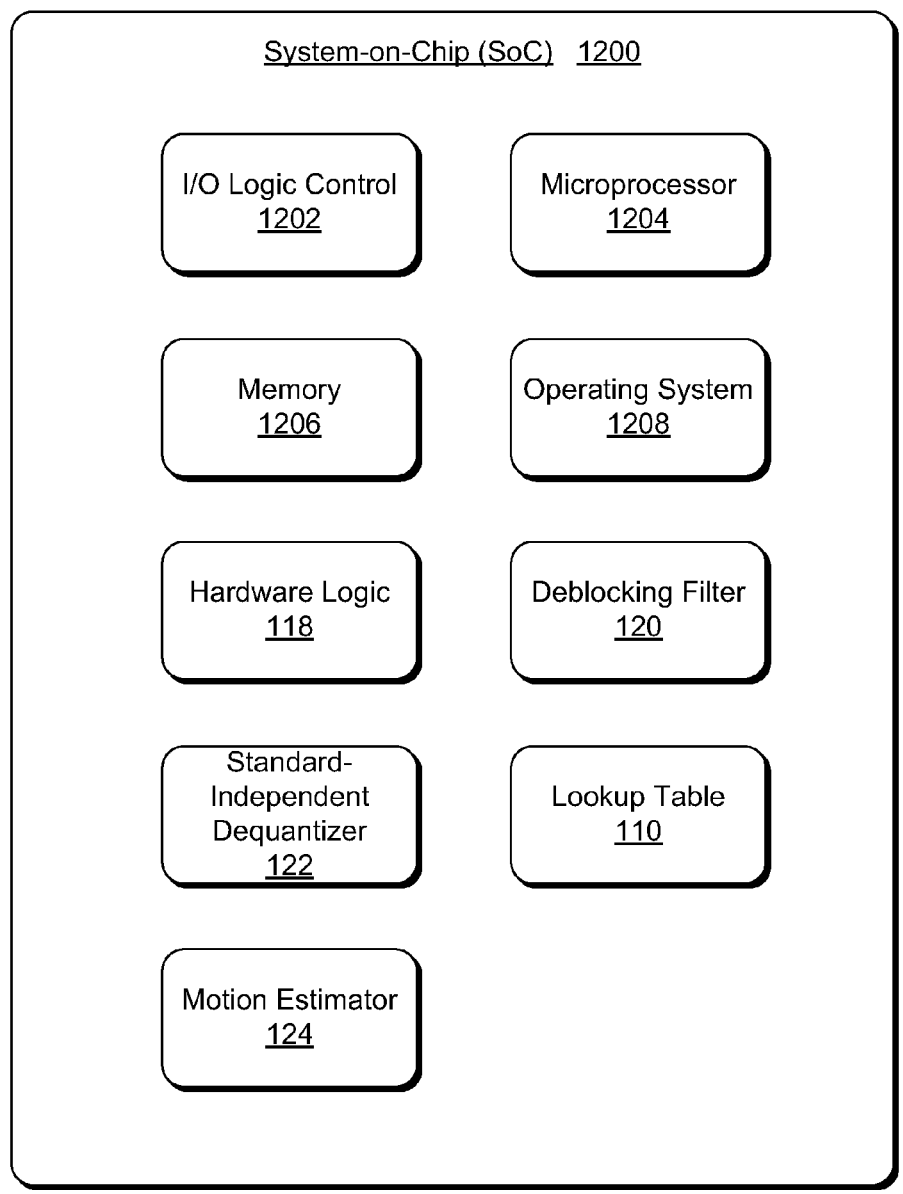
FIG. 12 illustrates an example system-on-chip (SoC) environment for implementing embodiments of the tools.

FIG. 12 illustrates an example System-on-Chip (SoC) 1200, which can implement various embodiments of the tools in many types of video coding devices. An SoC can be implemented in a fixed or mobile device, such as one or combination of a media device, computer device, television set-top box, video processing and/or rendering device, appliance device, gaming device, electronic device, vehicle, workstation, and/or in any other type of device that may communicate handle video data.

SoC 1200 can be integrated with electronic circuitry, a microprocessor, memory, input-output (I/O) logic control, communication interfaces and components, other hardware, firmware, and/or software needed to run a device. SoC 1200 can also include an integrated data bus (not shown) that couples the various components of the SoC for data communication between the components. A device that includes SoC 1200 can also be implemented with many combinations of differing components.

In this example, SoC 1200 includes various components such as an input-output (I/O) logic control 1202 (e.g., to include electronic circuitry) and a microprocessor 1204 (e.g., any of a microcontroller or digital signal processor). SoC 1200 also includes a memory 1206, which can be any type of random access memory (RAM), a low-latency nonvolatile memory (e.g., flash memory), read only memory (ROM), and/or other suitable electronic data storage. SoC 1200 can also include various firmware and/or software, such as an operating system 1208, which can be computer-executable instructions maintained by memory 1206 and executed by microprocessor 1204. SoC 1200 can also include other various communication interfaces and components, wireless LAN (WLAN) or PAN (WPAN) components, other hardware, firmware, and/or software.

SoC 1200 may include hardware logic 118, deblocking filter 120, standard-independent dequantizer 122, motion estimator 124, one or multiple elements of FIGS. 3, 5, 7, 9, 11, and/or lookup table 110. Examples of these various components, functions, and/or entities, and their corresponding functionality, are described with reference to the respective components of the example environment 100 shown in FIG. 1 or in other figures herein.

Although the subject matter has been described in language specific to structural features and/or methodological steps, it is to be understood that the subject matter defined in the appended claims is not necessarily limited to the specific features or steps described above, including orders in which they are performed.

What is claimed is:

1. A method comprising:

receiving, from a video stream processor, prediction parameters for blocks of pixels of a decoded video stream;

generating, based on the prediction parameters, messages and a return value, the messages usable for deblocking filtering the decoded video stream, the return value indicating whether deblocking filtering is to be performed for one or more of the blocks of pixels;

writing the messages usable for deblocking filtering the decoded video stream to a message queue of a pixel processor configured to perform the deblocking filtering; and outputting the return value to the video stream processor effective to indicate to the video stream processor that the messages have been written to the pixel processor.

2. The method of claim 1, wherein the blocks of pixels are chroma macroblocks or luma macroblocks of the decoded video stream.

3. The method of claim 1, wherein the decoded video stream comprises blocking artifacts from prior encoding of the decoded video stream, the artifacts reducing a visual quality of video rendered from the decoded video stream, and wherein the messages are usable to reduce or eliminate some or all of the artifacts.

4. The method of claim 1, further comprising storing the return value until the messages are written to the message queue of the pixel processor.

5. The method of claim 1, wherein generating the messages comprises calculating loop filter parameters based on properties of the blocks of pixels of the decoded video stream.

6. The method of claim 5, wherein the blocks of pixels of the decoded video stream share a vertical or horizontal edge with a current block of pixels of the decoded video stream that has not yet been deblocking filtered and for which the messages are usable for deblocking filtering.

7. The method of claim 5, wherein calculating loop filter parameters calculates boundary strength parameters.

8. The method of claim 7, wherein calculating boundary strength parameters is based on information about macro block edges of macro blocks neighboring a current macro block of the decoded video stream that has not yet been deblocking filtered and for which the messages are usable for deblocking filtering.

9. The method of claim 5, wherein the loop filter parameters comprise alpha, beta, and edge threshold values.

10. The method of claim 5, wherein generating messages comprises calculating the loop filter parameters for those of the blocks of pixels that share a vertical or horizontal edge with a current block of pixels of the decoded video stream that has not yet been deblocking filtered and for which the messages are usable for deblocking filtering.

11. The method of claim 1, wherein the prediction parameters comprise one or more of picture-level parameters, macro-block-level parameters, macro-block quantized scaled factor parameters, or block-level parameters.

12. A filter operation accelerator comprising:
a filter operation calculation block configured to:
receive, from a video stream processor, prediction parameters for blocks of pixels of a decoded video stream;
generate, based on the prediction parameters, messages and a return value, the messages usable for deblocking filtering the decoded video stream, the return value indicating whether deblocking filtering is to be performed for one or more of the blocks of pixels, and
write the messages usable for deblocking filtering the decoded video stream to a message queue of a pixel processor configured to perform the deblocking filtering; and
an output buffer configured to:
store the return value until the messages are written to the message queue of the pixel processor; and
output the return value to the video stream processor effective to indicate to the video stream processor that the messages have been written to the pixel processor.

13. The filter operation accelerator of claim 12, wherein the filter operation calculation block is further configured to calculate loop filter parameters based on properties the blocks of pixels of the decoded video stream and provide these loop filter parameters in the messages, and wherein the pixel processor is further configured to deblocking filter the decoded video stream using the loop filter parameters.

14. The filter operation accelerator of claim 13, wherein the blocks of pixels of the decoded video stream share a vertical or horizontal edge with a current block of pixels of the decoded video stream that has not yet been deblocking filtered and for which the messages are usable for deblocking filtering.

15. The filter operation accelerator of claim 13, wherein calculating loop filter parameters calculates boundary strength parameters based on information about macro block edges of macro blocks neighboring a current macro block of the decoded video stream that has not yet been deblocking filtered and for which the messages are usable for deblocking filtering.

16. The filter operation accelerator of claim 15, wherein calculating boundary strength parameters is further based at least in part on intra-coding or frame coding.

17. The filter operation accelerator of claim 13, wherein the filter operation calculation block is further configured to use lookup tables based on data extracted from the decoded video stream to calculate the loop filter parameters.

18. The filter operation accelerator of claim 13, wherein generating the messages comprises calculating the loop filter parameters for blocks of pixels that share a vertical or horizontal edge with a current block of pixels of the decoded video stream that has not yet been deblocking filtered and for which the messages are usable for deblocking filtering.

19. The filter operation accelerator of claim 12, wherein the prediction parameters comprise one or more of picture-level parameters, macro-block-level parameters, macro-block quantized scaled factor parameters, or block-level parameters.

20. The filter operation accelerator of claim 12, wherein the filter operation accelerator is embodied on a System-on-Chip (SoC).

* * * * *